(12) United States Patent
Landrock et al.

(10) Patent No.: US 10,719,831 B2
(45) Date of Patent: Jul. 21, 2020

(54) SECURE MOBILE USER INTERFACE

(71) Applicant: Cryptomathic Ltd., Cambridge, Cambridgeshire (GB)

(72) Inventors: Peter Landrock, Cambridge (GB); Mike Bond, Cambridge (GB)

(73) Assignee: Cryptomathic Ltd., Cambridge, Cambridgeshire (GB)

(*) Notice: Subject to any disclaimer, the term of this patent is extended or adjusted under 35 U.S.C. 154(b) by 210 days.

(21) Appl. No.: 15/672,133

(22) Filed: Aug. 8, 2017

(65) Prior Publication Data

US 2017/0357978 A1 Dec. 14, 2017

Related U.S. Application Data

(63) Continuation of application No. 14/429,748, filed as application No. PCT/GB2014/053209 on Oct. 29, 2014, now Pat. No. 9,760,888.

(Continued)

(30) Foreign Application Priority Data

Apr. 29, 2014 (GB) .................................. 1407528.7

(51) Int. Cl.
*G06Q 20/40* (2012.01)
*G06Q 20/32* (2012.01)
(Continued)

(52) U.S. Cl.
CPC ......... *G06Q 20/4016* (2013.01); *G06F 21/35* (2013.01); *G06F 21/56* (2013.01);
(Continued)

(58) Field of Classification Search
CPC . G06Q 20/4016; G06F 21/6218; G06F 21/56; H04L 67/02
See application file for complete search history.

(56) References Cited

U.S. PATENT DOCUMENTS 8,954,117 B2 2/2015 Huang
9,123,935 B2 9/2015 Huang
(Continued)

FOREIGN PATENT DOCUMENTS

EP 1467275 A2 10/2004
EP 1971111 A2 9/2008
(Continued)

OTHER PUBLICATIONS

First Office Action dated Oct. 2, 2018 in Japanese Application No. 2016-525887, 9 pgs. (Claims, priority to PCT/GB2014/053299).
(Continued)

*Primary Examiner* — Hao Fu
(74) *Attorney, Agent, or Firm* — Knobbe, Martens, Olson & Bear, LLP

(57) ABSTRACT

The invention provides systems and method for securely inputting user data from a user into a mobile device and also for generating user data to be input by a user into a mobile device. For example, there is provided a mobile device case for securely inputting user data from a user into a mobile device, the case comprising: a microcontroller, a communication module for communicating with the mobile device and a user interface to enable the user to input the user data. The microcontroller is preferably configured to receive the user data which is input by a user via the user interface, process said user data to create processed data and communicate said processed data to said mobile device. Alternatively, the microcontroller is configured to receive a request to generate the user data; generate said user data and display said user data on the user interface.

15 Claims, 9 Drawing Sheets

Related U.S. Application Data

(60) Provisional application No. 61/896,820, filed on Oct. 29, 2013.

(51) Int. Cl.

| | | |
|---|---|---|
| *G06F 21/35* | (2013.01) | |
| *H04L 29/06* | (2006.01) | |
| *H04W 12/06* | (2009.01) | |
| *H04M 1/725* | (2006.01) | |
| *G06F 21/56* | (2013.01) | |
| *G06F 21/62* | (2013.01) | |
| *G06F 21/83* | (2013.01) | |
| *H04L 29/08* | (2006.01) | |
| *H04M 1/22* | (2006.01) | |

(52) U.S. Cl.
CPC .......... *G06F 21/6218* (2013.01); *G06F 21/83* (2013.01); *G06Q 20/32* (2013.01); *G06Q 20/3226* (2013.01); *G06Q 20/4014* (2013.01); *H04L 63/0838* (2013.01); *H04L 63/102* (2013.01); *H04L 67/02* (2013.01); *H04M 1/72527* (2013.01); *H04W 12/06* (2013.01); *H04L 63/067* (2013.01); *H04L 63/0853* (2013.01); *H04M 1/22* (2013.01); *H04M 2250/22* (2013.01)

(56) References Cited

U.S. PATENT DOCUMENTS

| | | |
|---|---|---|
| 9,240,089 B2 | 1/2016 | Everhart |
| 2002/0089410 A1 | 7/2002 | Janiak et al. |
| 2003/0073415 A1 | 4/2003 | Engstrom et al. |
| 2004/0203486 A1 | 10/2004 | Shepherd et al. |
| 2005/0050330 A1 | 3/2005 | Agam et al. |
| 2006/0086786 A1 | 4/2006 | Spencer |
| 2006/0160560 A1 | 7/2006 | Josenhans et al. |
| 2007/0011724 A1 | 1/2007 | Gonzalez et al. |
| 2007/0210163 A1 | 9/2007 | Han |
| 2008/0041933 A1 | 2/2008 | Shibasaki |
| 2009/0069051 A1 | 3/2009 | Jain et al. |
| 2009/0069052 A1 | 3/2009 | Jain et al. |
| 2009/0083850 A1 | 3/2009 | Fadell et al. |
| 2010/0065630 A1 | 3/2010 | Spencer, II |
| 2010/0088439 A1 | 4/2010 | Ang et al. |
| 2010/0208424 A1 | 8/2010 | Swan et al. |
| 2010/0262840 A1 | 10/2010 | Benteo et al. |
| 2011/0101109 A1 | 5/2011 | Bona et al. |
| 2011/0177852 A1 | 7/2011 | Deepak et al. |
| 2011/0285668 A1 | 11/2011 | Kim et al. |
| 2012/0051272 A1 | 3/2012 | Jain et al. |
| 2012/0052929 A1* | 3/2012 | Thammasouk ....... G06F 1/1626 455/575.1 |
| 2012/0270528 A1 | 10/2012 | Goodman |
| 2012/0302294 A1 | 11/2012 | Hammond et al. |
| 2012/0321057 A1 | 12/2012 | Goodman |
| 2013/0077235 A1 | 3/2013 | Pawar et al. |
| 2013/0120913 A1 | 5/2013 | Petersson et al. |
| 2013/0198519 A1 | 8/2013 | Marien |
| 2013/0203473 A1 | 8/2013 | Kota |
| 2013/0278552 A1 | 10/2013 | Kamin-Lyndgaard |
| 2014/0089617 A1 | 3/2014 | Polzin et al. |
| 2014/0089682 A1 | 3/2014 | Gulati et al. |
| 2016/0260098 A1 | 9/2016 | Landrock et al. |

FOREIGN PATENT DOCUMENTS

| | | |
|---|---|---|
| JP | 11-175335 | 7/1999 |
| JP | 2002-108536 | 4/2002 |
| JP | 2007-503646 | 2/2007 |
| JP | 2010-539813 | 12/2010 |
| JP | 2013-150085 | 12/2010 |
| KR | 101287989 B1 | 7/2013 |
| WO | WO 2004/017255 | 2/2004 |
| WO | WO 2005/022288 | 3/2005 |
| WO | WO 2009/036357 | 3/2009 |
| WO | WO 2009/036393 | 3/2009 |
| WO | WO 2009/036395 | 3/2009 |
| WO | WO 2009/096767 | 8/2009 |

OTHER PUBLICATIONS

Partial International Search for International Application No. PCT/GB2014/053209 dated Jan. 27, 2015 in 6 pages.

Search Report for Application No. GB 1407528.7 dated Oct. 13, 2014 in 2 pages.

International Search Report and Written Opinion for International Application No. PCT/GB2014/053209 dated Mar. 19, 2015 in 20 pages.

ARM, "Building a Secure System using TrustZone Technology", Apr. 2009 Issue C (Copyright 2005-2009), ARM Security Technology Whitepaper.

Lovejoy, Ben, "Why Touch IDS is Bigger News Than Any of Us Appreciated", Sep. 17, 2013, 9to5Mac.

Japanese Office Action dated Feb. 25, 2020 for Japanese Patent Application No. 2019-071178.

* cited by examiner

SECURE MOBILE USER INTERFACE

CROSS-REFERENCE TO RELATED APPLICATIONS

This application is a continuation of U.S. application Ser. No. 14/429,748, filed Mar. 19, 2015, which is hereby incorporated by reference in its entirety and which is the U.S. National Phase under 35 U.S.C. § 371 of International Application No. PCT/GB2014/053209, filed Oct. 29, 2014, designating the United States, which claims priority to U.S. Provisional Appl. No. 61/896,820, filed Oct. 29, 2013 and United Kingdom Application No. 1407528.7, filed Apr. 29, 2014.

FIELD OF THE INVENTION

The invention relates to hardware-based user interfaces for mobile devices, and in particular to the usability of secure user interface systems and methods for entering data securely into mobile devices.

BACKGROUND TO THE INVENTION

Mobile devices such as smartphones, tablets and e-readers, are often used to view content on the Internet, purchase goods online, perform online banking transactions and check bank balances. Mobile device users regularly view data or perform transactions which require them to enter passwords before they are authorised to complete the transaction. However, mobile devices—just like conventional PCs—are susceptible to malware infection, and it can be difficult to enter confidential data securely, or important transactional data without the risk of tampering. Once a mobile device becomes compromised, the malicious software may record any confidential data entered by the user of the device and send it to a third party, or alter the data entered to cause the user to perform an unintended action, or alter data displayed to the user on the device in order to deceive the user (e.g. to cause the user to enter further confidential information). Malware attacks can result in a loss of funds, privacy and safety. Thus, there is a need to be able to enter data securely into a device (i.e. secretly or without the data being tampered with), such that any malware on the device cannot interfere with the process.

Many customers access their bank accounts online using their mobile devices. Financial institutions have set up a number of processes to decrease the risk that a customer's account is accessed without authorisation. For example, most institutions use secure websites (i.e. HTTPS communication protocol) for online banking, and most require at least one password to be entered to authorise access. Many banks use a OTP system to control access to an account and to authorise online banking transactions. Typically, a customer is required to enter a password and is used to log in to the website, and an OTP (one-time password) which is a password that is valid for only one login session or transaction, to authenticate a particular transaction. OTPs can be used in several different approaches.

An OTP may be sent by the bank to a customer's mobile phone via an SMS message. If the OTP is sent to the customer via SMS, the customer has to switch back and forth between the website and the SMS application on their mobile device in order to read the SMS, memorize the OTP and enter it on the website. Users may find this approach inconvenient or difficult to carry out.

The customer may generate OTPs when required by using a secure token. The secure token is typically a piece of hardware, which includes a clock or a counter. Consequently, time and event ordering is an important part of an OTP generation algorithm. Alternatively, the OTP may be generated by the customer using a chip authentication program (CAP) device, which is described in more detail below. Whichever method is used to generate the OTP, the user then enters the OTP into the bank's website in order to complete the online transaction.

A number of banks use the chip authentication program (CAP) for authenticating online banking transactions. CAP is a two-step authentication system, which requires both a "chip and PIN" bank card (or chip card) and a valid PIN in order to generate an OTP. A user who has logged-in to their online banking account and who wishes to perform a transaction (e.g. transferring money between accounts or making a payment) must enter the OTP generated using CAP into the online banking system in order for their transaction to succeed. CAP requires the use of a handheld device, or CAP reader, which typically comprises a card slot, a numeric keypad and a display capable of displaying a number of characters/digits. Users wishing to make an online banking transaction are required to insert their "chip and PIN" bank card into the card slot and enter their PIN into the CAP reader via the keypad. The user may also select the type of transaction they wish to make, as well as details of the transaction. The CAP reader outputs a numeric passcode (i.e. an OTP) generated using the PIN, bank card-specific data and the current time. The user is required to enter the OTP online to complete the banking transaction.

CAP requires users who wish to perform online transactions via their mobile devices to carry the CAP reader with them. FIG. 1 illustrates the relative sizes of a smartphone 22, a smartphone case 30, a chip and pin bank card (or EMV card) 32 and a CAP reader 34. As shown in FIG. 1, typical CAP readers 34 may be of a similar size to many smartphones 22, and thus, the user may find it cumbersome to carry an additional device with them. The CAP approach may also be unappealing to users because it requires them to use two different devices with two different user interfaces in order to complete a secure transaction. Furthermore, a CAP reader is only used for particular bank-related transactions and cannot be used to securely enter passwords or perform other actions which require entry of confidential user data.

Smartphones are typically only software-protected and consequently, smartphones and similar mobile devices are not yet widely used to store, or trusted to store, very sensitive information. For example, smartphones may not be trusted to store the confidential information that is stored in the chip of a debit or credit card. In contrast, the chip within a debit or credit card is generally considered to be sufficiently secure. One reason for the lack of security on smartphones is that, in spite of the fact that a chip or microprocessor of the smartphone contains a so-called secure element (that in theory could provide secure storage and adequate protection), this 'secure element' is entirely controlled by the operator of the telephone network. That is, this smartphone chip is not typically accessible to software apps supplied, for example, by banks to perform secure transactions (e.g. online banking transactions via a smartphone). Thus, the smartphone's 'secure element' is not used when a smartphone is used to perform a transaction, and as a result, smartphones are not able to store sensitive information securely particularly during a transaction.

Background information can be found in: EP1467275A2, U.S.2013/0120913, U.S.2013/0077235, U.S.2003/0073415, U.S.2002/0089410 and EP1971111A2.

The present applicant has recognised the need to enhance the user experience of secure mobile computing.

SUMMARY OF THE INVENTION

According to a first aspect of the present invention, there is provided a mobile device case for securely inputting user data from a user, the case comprising: a microcontroller, a communication module for communicating with a mobile device or a third party and a user interface to enable the user to input the user data. The microcontroller is preferably configured to receive the user data which is inputted by the user via the user interface, process said user data to create processed data and communicate said processed data to said mobile device or said third party.

According to a second aspect of the present invention, there is provided a method for inputting user data from a user into a mobile device case comprising a microcontroller, a communication module and a user interface to enable the user to input the user data. The method comprising receiving, at the microcontroller, user data input via the user interface, processing, at the microcontroller, said user data to create processed data and outputting said processed data via said communication module to a mobile device or to a third party.

In both these aspects, the user data is securely communicated to said mobile device or third party without said mobile device or third party being able to interpret the user data which was entered via the user interface. For example, neither the mobile device or third party is able to distinguish the entered user data from random data. The following features apply to both aspects of the invention.

The user data may comprise passwords (including PINs and passcodes), or sensitive transaction data such as payee details. The user data may comprise numeric digits or other characters, e.g. alphabet letters. The user data may be securely entered into an application (e.g. games, web browsers, office suites etc.) running on the mobile device. Alternatively, the user data may be securely communicated to a third party. The third party can be any party which requires the user data, e.g. a bank or shop; or may be a separate authentication service for such third parties.

The case includes a user interface through which the user inputs the user data either directly to the case or indirectly through the mobile device. However, in either arrangement and as explained in more detail below, use of the mobile device as a keyboard is avoided. Malware that may be present on the mobile device therefore is unaware of the characters entered by the user either because the characters are entered into the system using hardware integrated into the case without the mobile device receiving them direct, or because any data entered into the mobile device is only relative to unknown initial data. Furthermore, the user data is processed by the microcontroller of the case before being sent to the mobile device or third party and thus the user data is not received from the case in the clear, i.e. the user data cannot be determined from the processed data.

In order for this to work, the case must be able to send signals to the user so that the signals are not known to the mobile device. One option is for the user interface of the case to have at least one visual indicator to display to the user which character(s) is currently selected. The visual indicator may comprise one or more lights, e.g. LEDs. Such lights are small enough that they may be incorporated in the case without significantly increasing case weight or size. There may be a plurality of lights, e.g. one for each number from 0 to 9. The plurality of lights may be illuminated one at a time with the lit light indicating which character of the user data is selected. Alternatively, the plurality of lights may be all lit except one with the light which is not lit indicating which character of the user data is selected for input. Alternatively, different coloured lights may be used to show which character is selected for input, e.g. green for the selected character and red for other characters. In other words, one light is different from the others to indicate which character is being selected. The lights may be arranged along one or more sides of the case. Each light is preferably aligned with a character which may be shown on the case, or displayed on the mobile device screen.

The user interface may comprise a touch mechanism for a user to input each character in the user data. For example, where there is a plurality of lights, the touch mechanism may comprise a touch sensor whereby the user is able to change which light is illuminated. Motion of the user's finger may be detected by the touch sensor and cause cycling of the lit lights, e.g. by swiping along or holding down the touch sensor. The user may select a character in the user data by touching the sensor to commence cycling, then moving their finger away from the sensor when the cycling illuminates the desired light, and/or by tapping the sensor when the desired light is lit.

Additionally or alternatively, the touch mechanism may comprise a plurality of touch sensors each of which corresponds to a character of the user data. In this arrangement, the visual indicator may simply be characters adjacent/on each touch sensor so that a user simply presses the correct touch sensor to input a character. If the user interface includes a plurality of lights, each light may be located adjacent to a touch sensor. Multiple sensors may be provided such that each light has a corresponding sensor or sensor button arranged adjacent to it on the case. The user may tap the sensor associated with the desired light to make a character selection.

In the arrangements in which a touch mechanism on the case is used to input the user data, the mobile device does not know which characters have been selected, nor is aware of the data processed by the secure microcontroller. Accordingly, the process for entering the user data is concealed from the mobile device. The sensor(s) may be a capacitive sensor, i.e. a technology similar to that used in many laptop touchpads.

As an alternative to the user interface comprising a touch mechanism, the user interface may be configured to receive adjustment data from the mobile device via the communication module. The adjustment data may indicate a desired modification of the selected value displayed by the secure case. For example, in the arrangement where there is a plurality of lights, vertical touch gestures on the screen of the mobile device may be used to cycle through which light is lit. In this way, a user may be able to change the lit light by making use of the touch screen on the mobile device itself, without the absolute value of the data input being visible.

This method of entering the user data is more secure than entering characters using the mobile device's keyboard. Malware on the mobile device may be able to see the characters displayed on the screen, but cannot see which light is illuminated because the lights are part of the case and not part of the mobile device. However, the mobile device and thus any malware running on the device may be able to obtain information (albeit limited) about the user data from the movement of the user's finger. Accordingly, increased security may be provided by configuring the microcontroller to cause a single, randomly-chosen light to be lit or cause a single randomly chosen light to be switched off. The random light may be selected before each character of the user data is input for maximum safety or at least before the first character is input. The randomly-selected LED represents a random 'start position'. The user is not able to simply touch the screen next to the required character—they must cycle through the characters from the start position until they reach the desired numeral. The initial position of the user's finger on the screen and the distance it moves along the screen are known by the mobile device.

Furthermore, the display screen may be configured to display a set of characters, with each character being aligned with one of the plurality of lights. The user interface may additionally receive character data comprising the nature of the character aligned with each light. The set of displayed characters may be static in which case the user interface only receives the character data indicating which character is aligned with each light once. Alternatively, the set of displayed characters may be changed, e.g. to allow greater variety in the data which can be entered. In such an arrangement, each update to the set of characters needs to be communicated to the user interface. Again this character data is preferably sent to the microcontroller and the microcontroller processes the data. The microcontroller may be configured to determine which character is selected from the character data. However, while both the mobile device and the case are used to enter the user data, the processing occurs on the case and the mobile device is unaware which character, the user selected from the set on the display.

Once the user data, e.g. an entire PIN has been entered, the microcontroller in the case processes the user data, e.g. by performing a mathematical function on the received numerals. The processing may comprise verifying the characters of the user data entering by the user and the processed data which is output may be the result of the verification. The verification process may comprise comparing the received characters of the user data with a passcode stored in the microcontroller, to determine if the received characters match the stored passcode. Thus, in this arrangement, the mathematical function which is applied is a simple matching process. Alternatively the microcontroller may be configured to apply a cryptographic hash function or other similar one way function on the received characters. The output hash value may be compared to a hash value (or a value calculated using the same one-way function on the same input user data) stored in the microcontroller to determine if the outputted value matches the stored value. The advantage of using a one-way function is that the case does not store the user data in an accessible form but is always able to recreate the same value as the stored value if the same user data is input. If the user data (with or without being hashed) does not match, the user may be permitted another fixed number of chances to enter the correct user data after which if the correct data has not been entered correctly, the user may be locked-out and/or prevented from completing a transaction.

Additionally or alternatively, the microcontroller may be configured to encrypt the received numerical characters using a cryptographic key stored in the microcontroller. The encrypted data may be used for decryption and verification by a third party. In this arrangement, the mobile device case may not verify the received numerical characters itself, but transmits them to a third party (e.g. via the communication module to the mobile device) for authentication. The cryptographic key may be a public key, and the third party may use a private key to decrypt the encrypted data and determine if the user data matches a true user data known to the third party. In this scenario, no user-specific data needs to be stored on the system, thereby increasing security.

The system may be configured to use at least the received user data to generate a security token, such as a one-time passcode (OTP) or a transaction authentication number (TAN). Generation of the security token may require using further authentication data in addition to the received user data, such as a count, a current time, data related to the type of application running on the mobile device, data related to the type of mobile device, and/or user-specific data.

If the security token generation requires a count, the case may further comprise a counter to provide the count. Similarly, if the token generation requires a current time, the case may further comprise a clock. The clock may be synchronised with a clock of an authentication server linked to the application which requested a passcode.

If the token generation comprises user-specific data, the authentication data may be obtained by reading data from a smartcard (e.g. a "chip and pin" card or EMV card). Thus, the case may be configured to perform a similar function to the CAP readers described earlier. Accordingly, the case may further comprise a smartcard reader integrated in the case and/or a contactless smartcard reader integrated in the case. Alternatively, the microcontroller in the case may actually be an embedded EMV chip with the additional functionality required for the present invention.

The visual indicator may also be used to indicate the security mode of the system, i.e.to indicate whether the case is in an integrity or confidentiality protecting mode. For example, where there are a plurality of LEDs they may be multi-colour LEDs. One colour of light (e.g. green) might indicate confidentiality-protecting mode where the user data is never revealed in clear to the mobile device, as may be suitable for password entry. Another colour might indicate integrity-protecting mode, where the mobile device learns the data value in clear but cannot modify it without detection, as may be suitable for transaction payee or amount entry. The microcontroller may be configured to switch the colour of the LEDs as appropriate The mobile device case is designed to be used with a mobile device and is preferably releasably attachable to the mobile device. Generally, in use, the mobile device will be held within or at least partially covered by the mobile device case. Thus, according to another aspect of the invention, there is described a system comprising a mobile device case as described above and a mobile device comprising a display and a communication module for communicating with the mobile device case. There is preferably interaction and communication between both the mobile device and the mobile device case to enable the user data to be entered. However, as described above, the interaction is designed to prevent the user data being entered in the clear on the mobile device—or in any manner interpretable by the mobile device.

Alternatively, the functionality of the mobile device case may actually be provided as an additional feature built into the mobile device. The mobile device case and mobile device are thus fully integrated. The mobile device case may physically replace whole or part of the casing of a standard mobile phone. Alternatively, the system may comprise a virtual mobile device case whereby the functionality of the physical mobile device case described above is added to the mobile device. Where the case and mobile device are integrated, there needs to be two separate processors; a standard processor controlling the functionality of the mobile device and an independent and separate microcontroller providing the functionality of the mobile device case described above.

The or each processor may be implemented in any known suitable hardware such as a microprocessor, a Digital Signal Processing (DSP) chip, an Application Specific Integrated Circuit (ASIC), Field Programmable Gate Arrays (FPGAs), etc. The or each processor may include one or more processing cores with each core configured to perform independently. The or each processor may have connectivity to a bus to execute instructions and process information stored in, for example, a memory.

The mobile device may be configured to display a set of characters on the display. Where the case comprises a plurality of lights, a character may be displayed aligned with each light. As described above, the mobile device is configured to allow the user to control which light is lit using touch sensors within the mobile device. For example, a user of the system may selects each character in the user data from the displayed characters by swiping the touchscreen starting from a point on the screen adjacent an illuminated LED. In use, the case may cover a back face of the mobile device and be releasably secured to the mobile device along its sides.

There are other ways in which the mobile device and mobile device case can be configured to interact. For example, in a further aspect of the invention, there is provided a mobile device case for generating user data to be input by a user into a mobile device, the case comprising a microcontroller and a user interface to display the generated user data to the user. The microcontroller is configured to receive a request to generate the user data; generate said user data and display said user data on the user interface. In this arrangement, the case may be generating TANs and/or OTPs. The generation of the user data may be requested by a user or may be requested by a third party (e.g. via the mobile phone).

Generation of the user data may require using authentication data, such as a count, a current time, data related to the type of application running on the mobile device, data related to the type of mobile device, and/or user-specific data.

If the user data generation requires a count, the case may further comprise a counter to provide the count. Similarly, if the user data generation requires a current time, the case may further comprise a clock. The clock may be synchronised with a clock of an authentication server linked to the application which requested the user data.

If the user data generation comprises user-specific data, the authentication data may be obtained by reading data from a smartcard (e.g. a "chip and pin" card or EMV card). Thus, the case may be configured to perform a similar function to the CAP readers described earlier. Accordingly, the case may further comprise a smartcard reader integrated in the case and/or a contactless smartcard reader integrated in the case. Alternatively, the user-specific data may be stored (perhaps permanently) in the case, e.g. in a secure memory.

The user interface may comprise one or more visual indicators to indicate to the user a character for the generated user data. The visual indicator may comprise one or more lights, e.g. LEDs as described above. The plurality of lights may be illuminated one at a time in a sequence with each lit light indicating each sequential character of the user data. The lights may be arranged along one or more sides of the case. Each light may be aligned with a character which is being displayed on the mobile device itself. Alternatively, the case may comprise information which indicates which light corresponds to which character (e.g. characters adjacent the lights).

The generated user data may be entered as it is generated into the mobile device. Thus, according to a further aspect of the invention, there is provided a mobile device case for generating user data as described above and a mobile device comprising a display.

The mobile device may be configured to display a set of characters on the display. Furthermore, as described in more detail in relation to the previous embodiment, the mobile device case may comprises a plurality of lights with each displayed character aligned with one of the plurality of lights. By contrast to the previous embodiments, these lights are used to indicate which character of the user data is being generated. For example, the LEDs integrated in the case may flash in sequence to show a passcode generated by the microcontroller.

The mobile device may display a virtual keypad whereby the user enters the user data as it is generated into the mobile device. The virtual keypad may be the same as the displayed characters adjacent the lights or may be a separate keypad. For example, in use, the user may tap buttons on a virtual keypad displayed on the touch screen of the mobile device, where the keypad buttons are aligned with the lights. As the user touches the appropriate keypad button corresponding to each flashing light, the user enters the user data, e.g. a multi-digit numeric code, by copying the light flashes. Advantageously, the user does not need to switch between devices to generate and enter a passcode, and does not need to memorise any digits of the code. Furthermore, there does not need to be any communication (wireless or otherwise) between the case and the mobile device. Moreover, when the lights are arranged next to the virtual keypad on display screen of the mobile device, the process of entering the user data is simplified for a user.

It will be appreciated that the user data could also be entered using the secure method described above and thus the two aspects of the invention can be combined.

In all of the above embodiments, the mobile device may be a mobile phone, smartphone or tablet computer, or any other electronic device on which an application may be configured to request a user for a secure data entry. The case may be any component which is attachable to the mobile device. For example, the case may be a cover which covers all or part of the back of the mobile device. Alternatively, the case may attach to just one or more sides of the mobile device.

The communication module may be a wireless communication module to enable the case to wirelessly communicate with the mobile device. The wireless communication module may be a Bluetooth chip or a Bluetooth low energy chip.

The invention further provides processor control code to implement the above-described systems and methods, for example on a general purpose computer system or on a digital signal processor (DSP). The invention also provides a carrier carrying processor control code to, when running, implement any of the above methods, in particular on a non-transitory data carrier—such as a disk, microprocessor, CD- or DVD-ROM, programmed memory such as read-only memory (Firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (Firmware). Code (and/or data)

to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system.

The software which is running on the microcontroller on the physical or virtual mobile device case is preferably not reprogrammable or developed by the same party as the mobile device or third party. This means that the software for the case may be simpler but still developed to higher security standards than any software running on the mobile device itself.

BRIEF DESCRIPTION OF THE DRAWINGS

The invention is diagrammatically illustrated, by way of example, in the accompanying drawings, in which:

FIG. 3b is a flowchart of the steps in entering a passcode on the system of FIG. 3a;

DETAILED DESCRIPTION OF THE DRAWINGS

Broadly speaking, the present invention provides a case for a mobile device—separate or actually build as an enhancement to a smartphone but fully integrated into one enhanced unit—wherein the case is configured to communicate with the mobile device and enable digits forming a PIN or passcode to be securely entered into an application running on the mobile device. The application could be any software application running on the device, e.g. games, web browsers, office suites etc. The invention is described below primarily using the example of a user performing an online banking transaction via a web browser running on their mobile device. However, it will be appreciated that online banking is merely illustrative and the system can be used to establish secure communication with any third party, for example for secure Internet shopping, or as a point-of-sale (POS) terminal in a real shop.

As outlined above, when a user wishes to perform an online banking transaction using their mobile device, the user typically accesses their account using a web browser. The user enters a PIN or password using the keyboard on the mobile device to access a secure part of a bank's online banking service and enters a second passcode or OTP to complete the online banking transaction. However, if malware is running on a mobile device, it may be able to detect or intercept keyboard presses (virtual or real) and/or see what has been entered on the display of a mobile device. Thus, it may be able to detect the user's secret PIN or passcodes, which may result in the user's account being accessed without authorisation, and/or the user's details being used to perform unauthorised transactions. (In the following, the terms passcode, password, PIN and OTP are used interchangeably).

The present invention provides a solution to this problem by requiring a user to enter a passcode without using the mobile device keyboard. Furthermore, in some described arrangements, passcode digits are not displayed (even briefly) on the mobile device display. This may be achieved by the user inputting digits corresponding to their passcode using hardware integrated into the case, such that use of the mobile device keyboard is avoided. Malware running on the mobile device therefore is unaware of the digits entered by the user.

Figure 1:
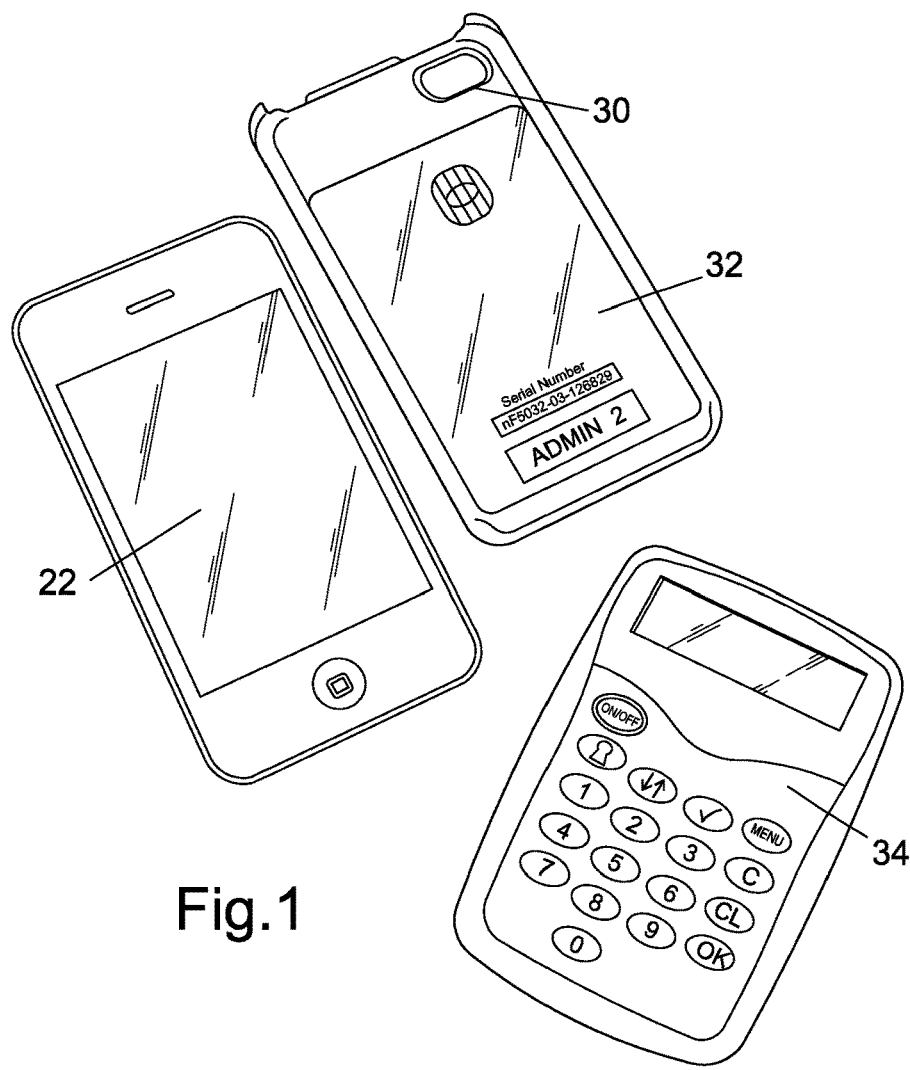
FIG. 1 illustrates the relative sizes of a smartphone, a smartphone case, a bank card and a CAP reader.

There are many covers or cases currently available on the market for mobile devices. These generally provide protection around part of or the whole of the mobile device (e.g. to protect the mobile device from scratches). FIG. 1 shows an example mobile device 22 and a conventional form-fitting case 30 for the device. Form-fitting cases are designed to fit specific mobile devices. The cases generally comprise slots or apertures to allow access to the mobile device's buttons, camera lens, headphone and charger sockets etc. Typically, a mobile device is inserted into the form-fitting case such that the case protects the back and sides of the phone from damage; leaving the front visible and accessible by a user. The case may be formed of an impact-absorbing material, e.g. hard polymer material, rubber, or vinyl. These protective cases typically do not perform any further technical function.

Figure 2:
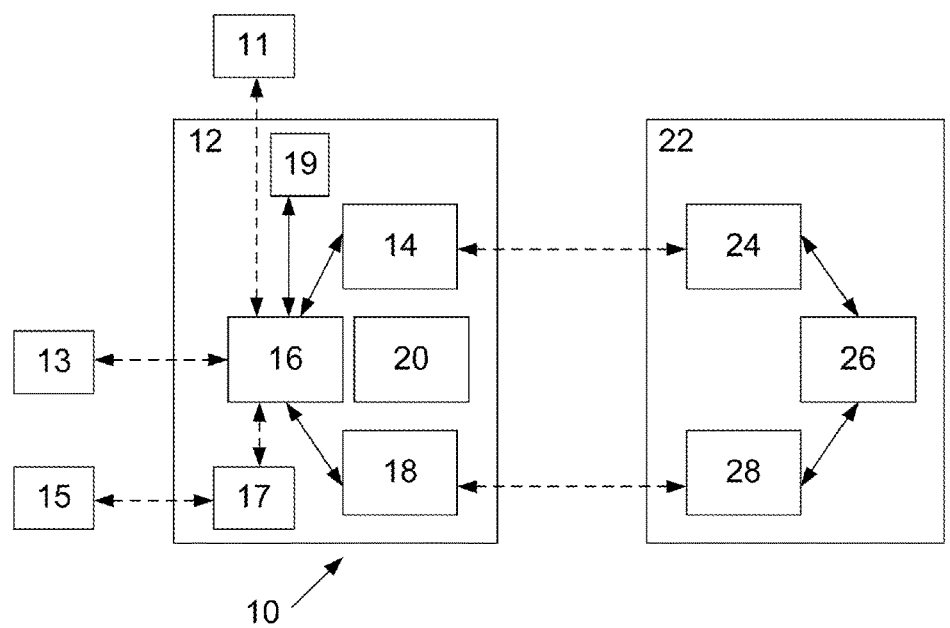
FIG. 2 shows a schematic of a secure user interface system comprising a mobile device and a mobile device case.

Turning now to FIG. 2, this shows a schematic of a secure user interface system 10 for a mobile device. The secure user interface system 10 comprises a case 12 for a mobile device 22 which may generally be similar in size, material and shape to that of known cases. By contrast with the known cases such as that shown in FIG. 1, the present invention provides a case 12 which comprises hardware components and which can communicate with the mobile device 22 held in the case to enable secure passcode entry when performing, for example, Internet banking transactions. The case 12 may also offer the same protection as a standard cover. The case 12 may cover some or all of the back and sides of the mobile device, preferably leaving the display screen of the mobile device visible and accessible to the user, as well as a camera that may be present on the back of the mobile device.

The mobile device 22 comprises multiple standard components for example a display screen 28, a central processing unit (CPU) 26 and a communication module 24. The display screen 28 may be a touchscreen e.g. a capacitive touchscreen. The communication module may comprise a Bluetooth® chip or other means for short-range wireless communication.

The case 12 comprises a number of components integrated into the case, for example a communication module 14, a microcontroller 16 and a user interface 18. The user interface may comprise a visual indicator in the form of a plurality of light-emitting diodes (LEDs) which may be arranged as described in more detail below. The user interface 18 is controlled by the microcontroller 16 within case 12 to provide a visual indication to the user to enable the user to enter a passcode. The microcontroller is preferably a secure microcontroller which may comprise at least one central processing unit (CPU), e.g. 8-bit to 32-bit, at least one dedicated encryption engine, at least one random number generators and/or other features to secure communication channels and to protect data. The microcontroller may comprise a microprocessor. The microcontroller 16 inside case 12 also controls the communication module 14, which may comprise a Bluetooth® chip 14 to enable the case 12 to communicate with the mobile device 22 held within the case, via the Bluetooth or Bluetooth low energy (BLE) protocols. Alternatively, case 12 may communicate with mobile device 22 using other wireless communication protocols which preferably provide low power short-range communication. For example, the case may comprise a near-field communication (NFC) antenna to establish a radio communication channel between devices (i.e. between case 12 and mobile device 22) that are in close proximity. Case 12 may comprise further a touch mechanism such as a capacitive slider and/or capacitive buttons along the edge of the case (see FIGS. 4a and 4b, and the accompanying description below).

The hardware within the case 12 is powered by battery 20, which may be a rechargeable battery. The rechargeable battery may be re-charged via a battery charger connected to an AC mains supply (which may be the same charger to charge mobile device 22 or a separate charger), or via inductive or wireless charging. Alternatively, the battery 20 may be a non-rechargeable battery such as those commonly used in portable devices having low current drain. As case 12 is typically only utilised when entering passcodes on mobile device 22, the hardware components within case 12 may only be used intermittently, and thus, it may be sufficient to use a non-rechargeable battery within the case 12 which lasts the lifetime of a typical mobile device (e.g. >2 years).

In a particular implementation of the invention, a relationship needs to be established between organisations that provide customers with access to their accounts online (e.g. financial institutions with online banking facilities), and the providers of the secure user interface system. For example, banks or online shops may need to configure their websites such that when a user attempts to perform an online transaction, the website prompts the user to use the secure user interface system 10 to enter their passcode (and any other additional numerical security information), rather than using a keypad (virtual or real) on their mobile device.

As shown in FIG. 2, the mobile device case 12 may also comprise a memory 19. The memory may be part of the microcontroller 16 or provided as a separate storage/memory module within the case 12. The memory 19 may be used to temporarily store data entered by a user into the case, store user-specific data e.g. a user's passcode or a hashed version of the passcode, which may be used to verify the data entered by the user, and/or any other data used to verify data, produce secure tokens or encrypted data for transmission etc. The memory 19 may store processor control code to implement various steps of the invention.

As mentioned above, the case 12 may comprise a communication module 14, which enables the case 12 to communicate with the mobile device 22. Additionally or alternatively, case 12 may comprise a further communication module 17 which may enable the case 12 to communicate directly with a third party 15, thus bypassing the need to communicate with the mobile device 22. This may be more secure as no data is received by the mobile device. The communication module 17 may use a wireless communication protocol to establish a communication link between the case 12 and the third party 15.

The case 12 may comprise a smartcard reader 11 integrated in the case and/or a contactless smartcard reader integrated in the case. Alternatively, the case 12 may comprise an embedded EMV chip 13, which may be part of the microcontroller or a separate element within the case. Thus, the case may perform the functionality of a CAP reader, and the user may be required to securely enter a valid PIN or passcode into the mobile device (as described in detail below) in order for the microcontroller 16 to generate an OTP using both the PIN entered by the user and, either the data read using the smartcard reader 11 or the data stored on the embedded EMV chip 13.

Figure 3A:
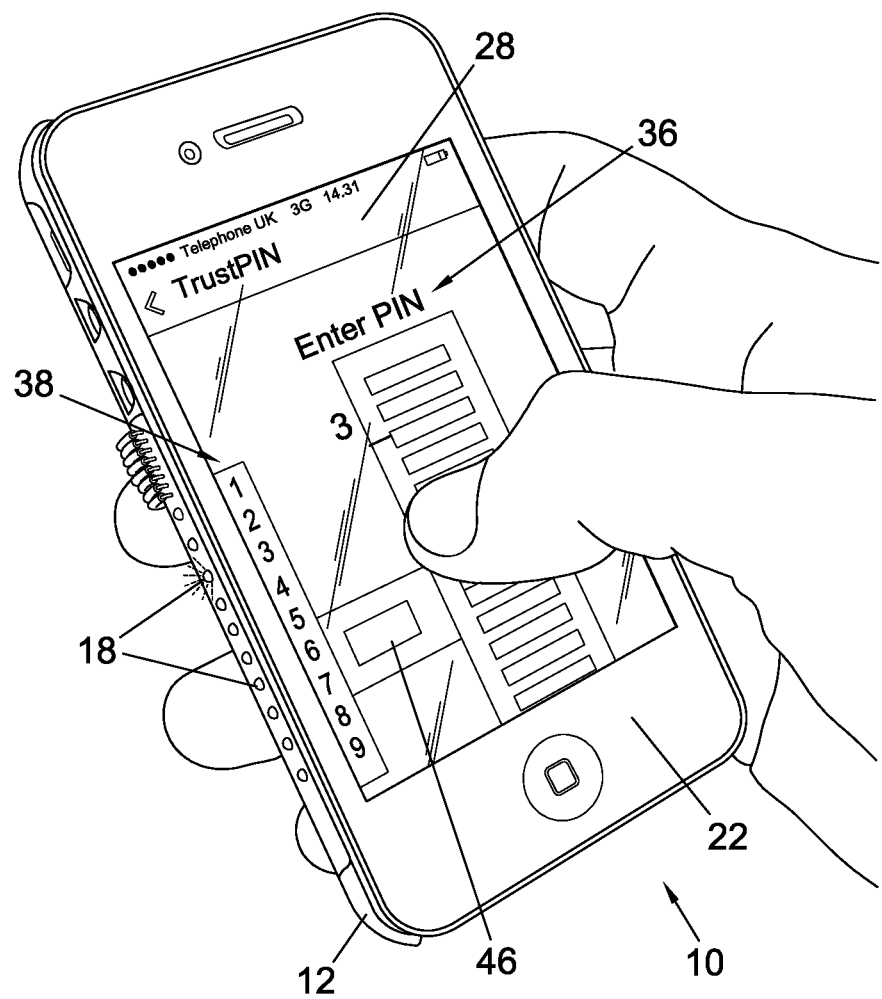
FIG. 3a illustrates one arrangement of the system of FIG. 2 to perform a secure transaction.

FIG. 3a illustrates a prototype of the secure user interface system 10 comprising a mobile device 22 and a case 12. In this arrangement, the visual indicator on the case comprises a plurality of LEDs which are integrated into and are provided along one side of the case. Alternative light sources may also be used. When a user of the secure user interface system 10 wishes to perform an online banking transaction (or other similar secure transaction) via a web browser application running on their mobile device 22, the bank (or other third party) communicates with the secure microcontroller 16 of the case 12 (via the CPU 26 of the mobile device 22) to initiate PIN entry via the case 12. A static set of characters 38 (e.g. numerals 0 to 9) is displayed on the display screen 28 of the mobile device. Additional digits, e.g. alphabet or other characters, may also be displayed. However, it is important that each one of the displayed characters is aligned with one of the LEDs 18. Thus, in the illustrated example, there are ten LEDs, each representing one of the numerals 0 to 9. However, this arrangement of LEDs and display of characters is merely illustrative and any number of LEDs and/or characters could be used. Moreover, the LEDs 18 could be provided along the opposite side of the case (e.g. for left-handed users) or along two or more sides of the case.

A bank customer who wishes to use the secure user interface system 10 may need to provide the bank with certain information in order to configure their account. For example, they may need to inform the bank what type of mobile device 22 they will use to access their account (e.g. the mobile device manufacturer, device model number etc). Mobile device screen dimensions vary between manufacturers and models, and thus, this information may be required to ensure that the static characters 38 are correctly displayed on the display screen 26 such that they are aligned with the LEDs 18. The user may also be required to create a unique PIN or numeric passcode, which is entered using the secure user interface system 10 when performing an online banking transaction. Additionally or alternatively, the PIN may be provided to the user by the bank. The PIN may be known to the secure microcontroller within case 12, such that when a user enters the PIN the secure microcontroller can verify whether the PIN is correct or not. Alternatively, the PIN may not be known to the secure microcontroller, such that a third party may need to verify whether or not the PIN is correct. This is described in more detail below with reference to FIG. 5.

As mentioned above, the secure user interface system enables users to enter PIN digits without using a keyboard on the mobile device, and thus, malware is unable to determine which keys the user has pressed. FIG. 3a shows one embodiment of the invention, in which the user uses the touchscreen 28 of the mobile device 22 to select numerals, but without entering any numerals using a keyboard. In this illustrative arrangement, static numerals 38 are displayed on the display screen 28, such that each numeral is aligned with one of the plurality of LEDs 18 along the edge of the screen. The secure microcontroller integrated within the case 12 is prompted to cause a single, randomly-chosen LED to light-up. In FIG. 3, the LED which is next to the numeral '2' on the display screen is illuminated. Malware on the mobile device may be able to see the static numerals 38 displayed on the screen, but cannot see which LED is illuminated because the LEDs (and the circuitry to control them) are part of the case 12, not part of the mobile device 22.

Figure 3B:
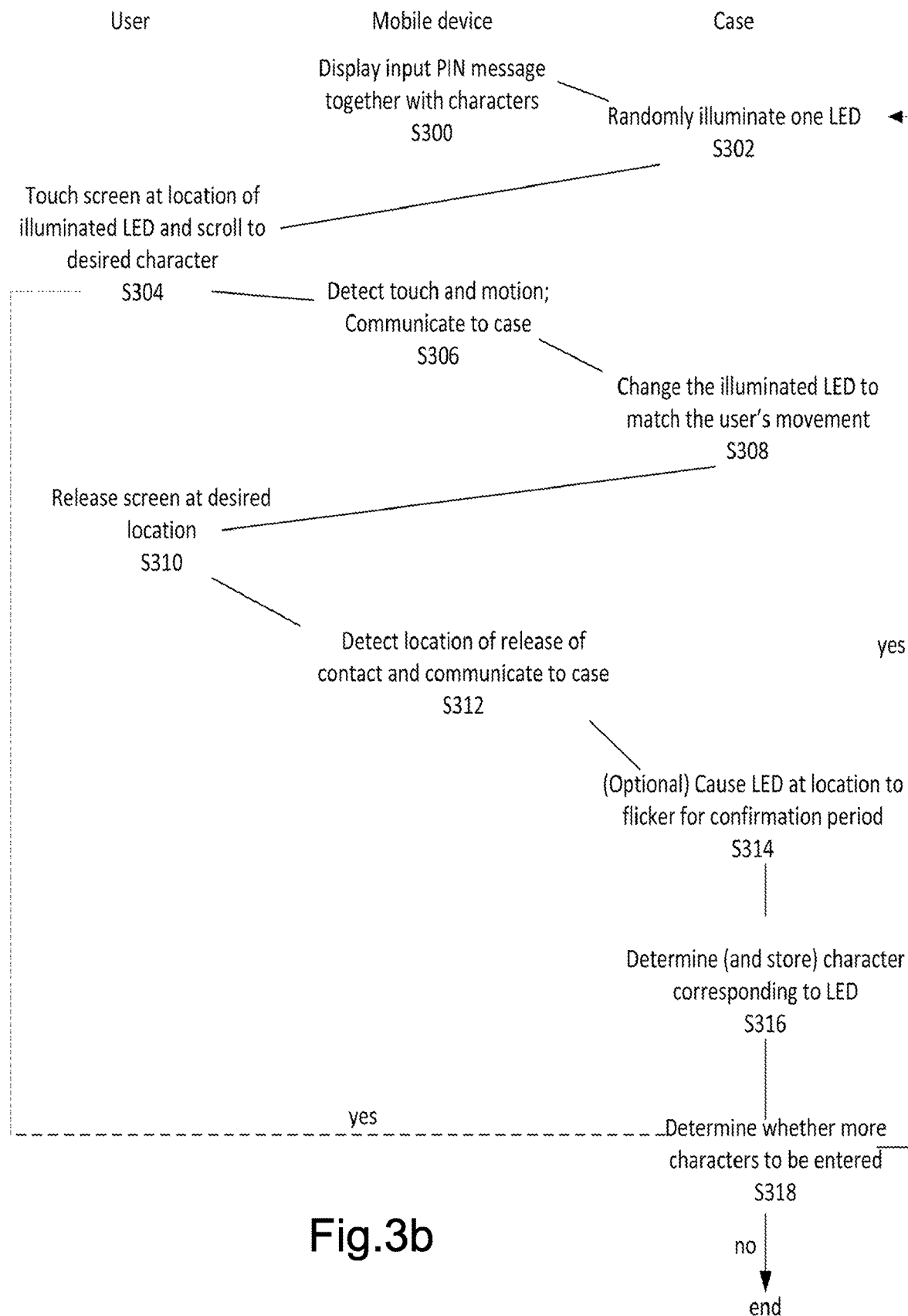

FIG. 3b shows the interaction between the user, mobile device and mobile device case to securely input a PIN. At step S300, the user is prompted by an on-screen message 36 to input their PIN, digit by digit. The on-screen message comprises the characters which are required to enter the PIN, e.g. as a list at one side of the mobile device screen. Furthermore, as shown in FIG. 3a, the on-screen message 36 may include a column of boxes, where there are at least as many boxes as there are digits in the user's PIN. The user in FIG. 3a is in the process of entering the third digit of their PIN (as indicated by the numeral '3' pointing to the third box in the column). However, as shown, the first and second digits entered by the user are not displayed in the first and second boxes on the screen. (The boxes may become greyed-out or may contain an asterisk when a digit has been entered, so that the user is presented with a visual indication of which digits they have entered so far). In this way, no characters of the PIN are displayed on the mobile device.

At the same time as the on-screen message appears (or moments later), one of the LEDS is randomly selected and thus illuminated by the microcontroller within the case. The on-screen message may optionally include an indicator 46 which may appear on the screen next to the randomly-selected LED. Thus, in the example shown in FIG. 3a, the indicator 46 begins next to the numeral '2', as the corresponding LED is illuminated. However, for increased security, no such indicator is used, so that there is nothing on the screen to indicate which LED is first illuminated.

The next step (S304) is for the user to touch the screen 28 with their finger and move the indicator 46 upwards or downwards from the indicator's starting position on the screen, in order to select a specific numeral. (If no indicator is provided, the user simply positions their finger next to the randomly-selected illuminated LED and moves up or down to select a numeral). The touch and subsequent motion across the screen 28 is detected by the mobile device and communicated to the case (S306). The illuminated LED changes as the position of the user's finger changes on the screen (S308). The user may release their finger from the screen when the LED corresponding to the desired numeral is illuminated (S310). This motion is detected by the mobile device and communicated to the case (S312). The LED may flicker briefly for a 'confirmation period' before the selection is finalised, in case the user accidentally lifted their finger from the screen. If the user touches the screen during the confirmation period, they may be able to change their numeral selection. (If the user accidentally selects the wrong numeral and does not change it during this period, they may need to cancel and re-start the whole process).

Although the mobile device detects the movement across the screen; information about which LED is illuminated (and therefore, which numeral is selected) is only known to the secure microcontroller in the case 12, and not to the mobile device 22. Accordingly, the characters selected by the user are known only by the secure microcontroller in the case 12 and may be stored in memory on the case 12 (S316). Malware in the mobile device 22 will find it difficult to deduce which PIN digit was entered merely from observing the user's scrolling motion on the screen 28, which begins from an unknown start point on the screen.

After a character has been entered, the system (e.g. the controller of the case as illustrated) determines whether or not any further characters are required for the PIN (S318). It will be appreciated that the mobile device could make the determination as to whether or not the PIN has been completely entered or the user may be able to input that the PIN is complete.

If more characters are required, for further security, after a character has been entered, the microcontroller within the case 12 randomly-selects an LED to illuminate as the start position for the next character to be entered. In other words, the process returns to Step S302 and the process of entering the next character begins. In this way, the user's start position on the screen may differ each time a new digit is to be selected. Alternatively, the LED which was selected as the previous character may remain illuminated and a user may scroll from this location. In other words, the process may return to Step S304 (shown in dotted lines as an alternative). It is important to note that in either approach the user cannot tap the screen 28 next to the desired digit in order to make a selection, as this is similar to using a keyboard to make a numeral selection. The user must scroll from the start position (in the upwards and/or downwards directions) until they reach the desired numeral. The scrolling may be cyclical. Security may be improved further by only permitting the user to scroll in a single direction (i.e. upwards or downwards) only, which reduces the risk of the PIN becoming known from the direction of travel (of the user's finger on the screen).

Once the entire PIN has been entered using this process, the secure microcontroller in the case 12 can perform a mathematical function on the received numerals. If the secure microcontroller knows the user's true PIN (from the set-up process or otherwise), the mathematical function may comprise comparing the user-entered digits to the true (stored) PIN within the microcontroller to determine if the user should be permitted to continue with the banking transaction. If the user enters an incorrect PIN, the user may be permitted another fixed number of chances to enter the correct PIN, after which if the PIN has not been entered correctly, the user may be locked-out of their online banking account and prevented from completing the transaction. Examples of the mathematical functions performed by the secure microcontroller are described in more detail below with reference to FIG. 5.

Figure 4A:
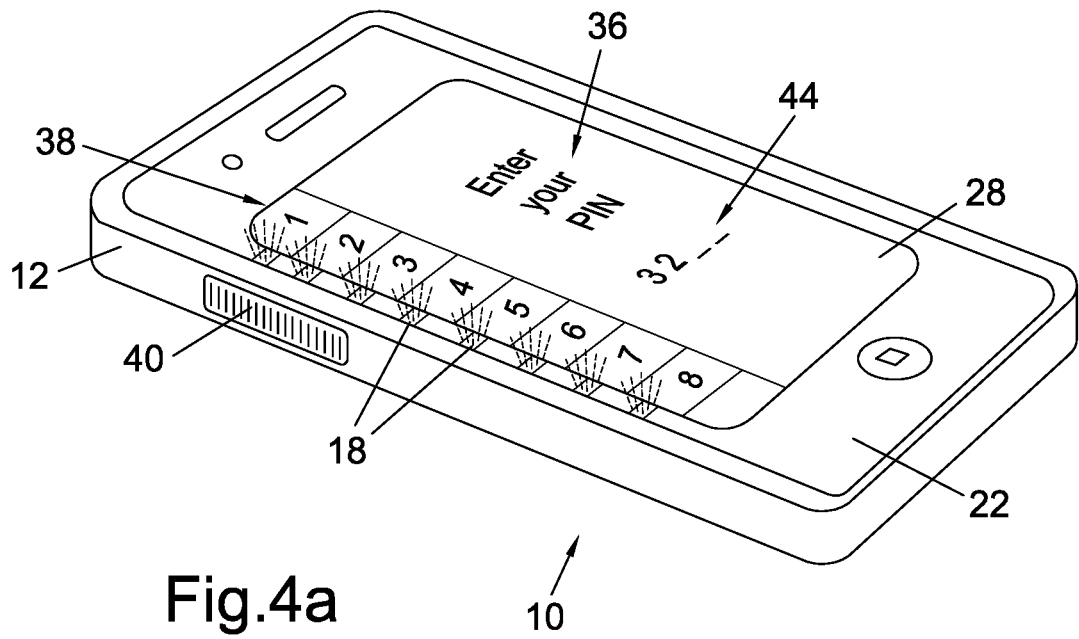
FIG. 4a illustrates an alternative secure user interface system in which the mobile device case comprising a touchpad.
Figure 4B:
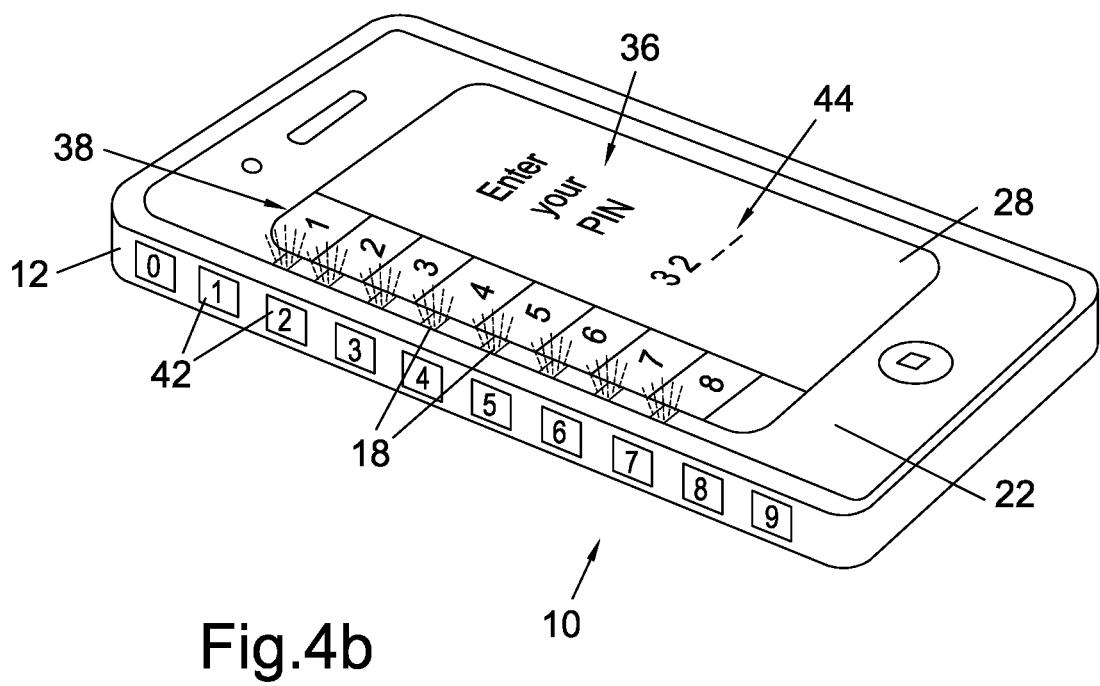
FIG. 4b illustrates an alternative secure user interface system in which the mobile device case comprising discrete touchpad buttons.

In FIG. 3a the user uses the touchscreen 28 of the mobile device 22 in order to select digits from a static set of numerals 38. FIGS. 4a and 4b illustrate alternative arrangements for digit selection. In FIG. 4a the mobile device case 12 comprises a touchpad 40. Instead of using the touchscreen 28 for digit selection, the user may select digits using a sensor or touchpad 40 which is integrated into the side of case 12. The sensor 40 may be a capacitive sensor, i.e. a technology similar to that used in many laptop touchpads.

Figure 4C:
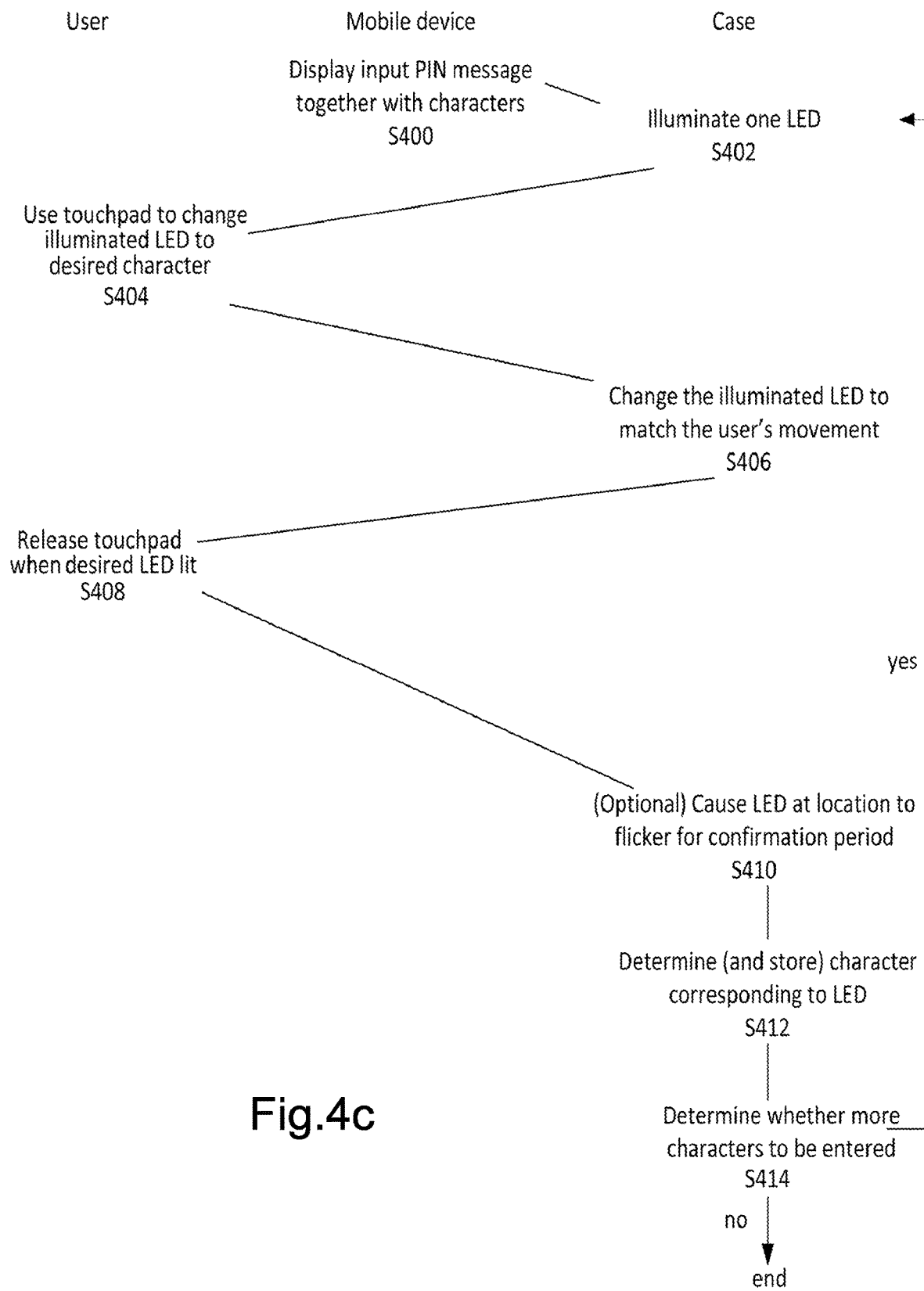
FIGS. 4c and 4d show a flowchart of the steps entering a passcode on the systems of FIGS. 4a and 4b respectively.

FIG. 4c shows the interaction between the user, mobile device and mobile device case to securely input a PIN in the arrangement of FIG. 4a. As in the previous embodiment, the mobile device may display an "input PIN" message which may comprise the characters for entering the PIN aligned with the LEDs (S400). The case illuminates one LED (S402) and the user changes the lit LED to match the desired character (S404). However, by contrast to the previous arrangement, the motion of the user's finger is detected by the sensor 40 on the case and thus it is not as necessary for the first LED which is lit to be random. There is no way that the mobile device can detect movement on the touchpad. The user may select digits by moving their finger away from the sensor 40 when the cycling illumination process illuminates the desired LED, and/or by tapping the sensor 40 when the desired LED is lit (S408). As in the previous embodiment, there may be an optional "flickering" step to allow a user to change their mind (S410). The microcontroller in the case then determines and stores the character which corresponds to the LED (S412) and determines whether or not any more characters are required (S414). Again this determination as to whether or not the PIN is complete can be made in different ways. If more characters are required, the process cycles back to illuminating a LED which can be the same one as just entered or a different one (S416).

Figure 4D:
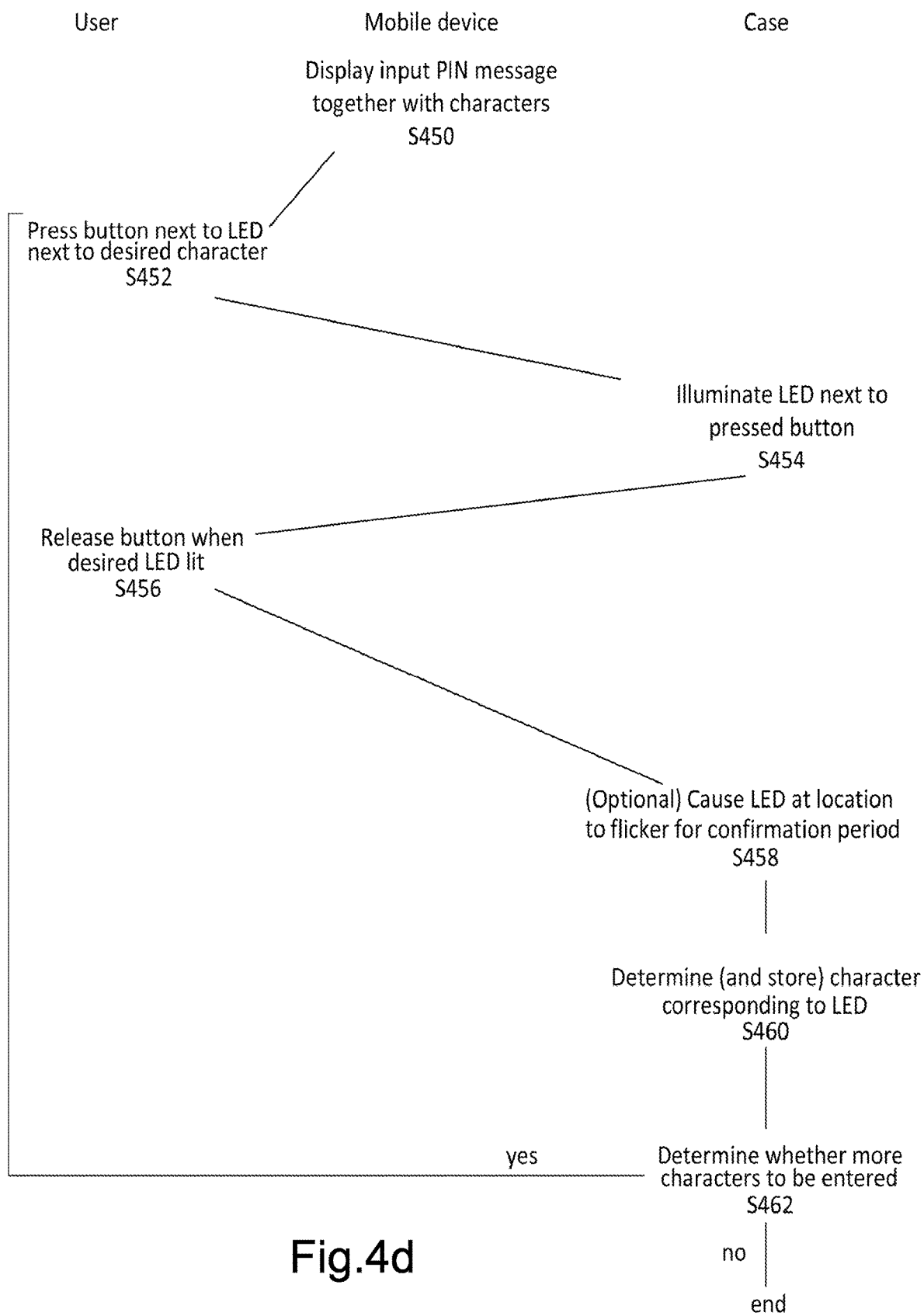

In FIG. 4b the mobile device case 12 comprises a plurality of discrete touchpad buttons 42. Ten such touchpad buttons 42 may be provided along one side of the case which may be numbered 0 to 9 (or other characters required for the PIN). If the buttons are labelled, a user is able to enter their PIN simply by keying in the correct sequence of buttons and there is no interaction between the case and mobile device to create the PIN. The discrete buttons 42 are thus similar to a keypad, but here the buttons are integrated into the case 12, rather than provided on the mobile device 22, which maintains security during PIN entry. Advantageously, providing the buttons along a side of the case means the user of the secure user interface system 10 does not need to switch between applications on their mobile device or flip the device over to access the buttons, which thereby enhances the user experience.

Where the buttons are labelled, the LEDs may be omitted. Alternatively, the case may still interact with the mobile device, even if the buttons are labelled, in a similar manner to that described previously. In this arrangement, the buttons may be aligned to the LEDs 18, such that one button corresponds to one LED. FIG. 4d shows how there may be some interaction between the device and its case. As in the previous embodiments, the mobile device may display an "input PIN" message which may comprise the characters for entering the PIN aligned with the LEDs (S450). To select a displayed character, the user may simply press the button next to the desired character (S452). This causes the LED next to the button to be illuminated (S454). Once the LED is illuminated, the user releases the button (S456) and the process may optionally cause the LED to flicker for a confirmation period (S458). The microcontroller in the case then determines and stores the character which corresponds to the LED (S460) and determines whether or not any more characters are required (S414). Again this determination as to whether or not the PIN is complete can be made in different ways. If more characters are required, the process cycles back to waiting for a user to press the next button (S452).

There are many other ways of entering the PIN using the secure user interface system. For example, the mobile device case 12 may be provided with a rotatable wheel instead of the touchpad 40 or buttons 42. The wheel may be rotated by the user to change which LED is illuminated. The user may either stop rotating the wheel when the LED corresponding to the desired numeral is illuminated and/or may tap or press the wheel to make a selection.

Figure 5:
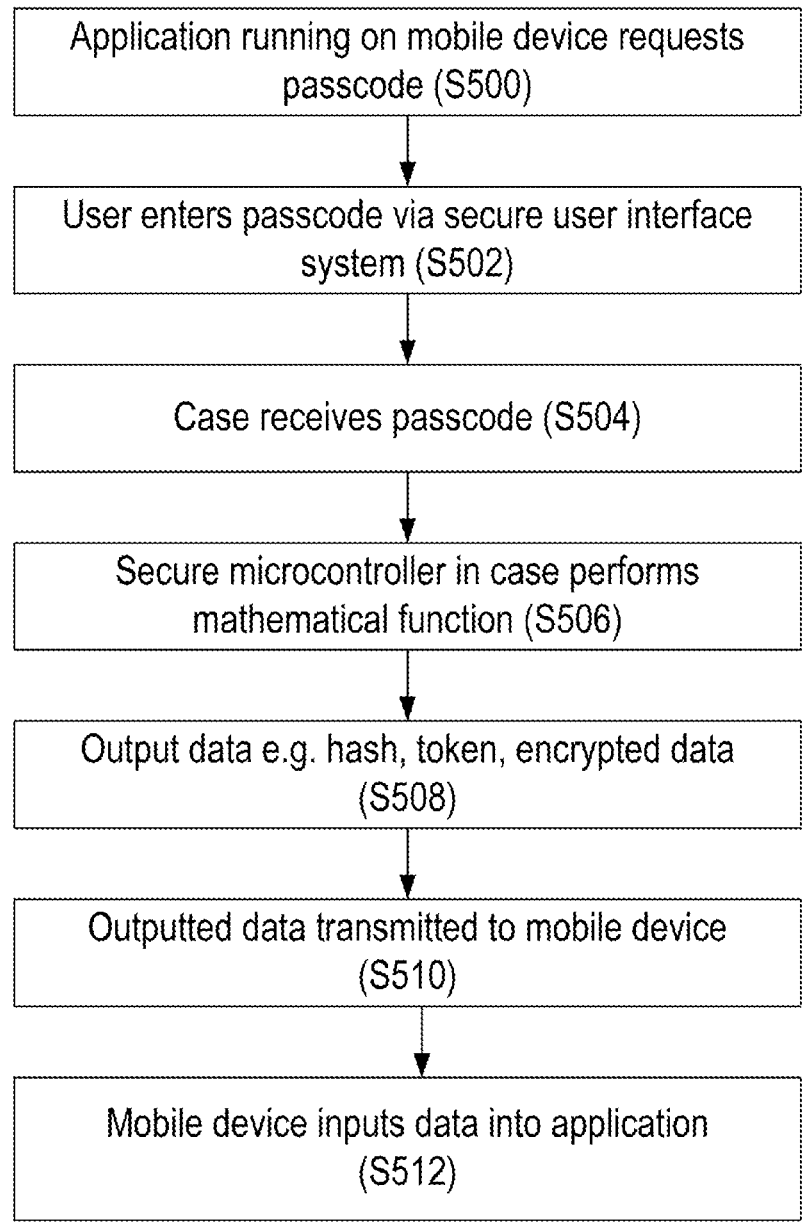
FIG. 5 shows a flowchart of the general steps in entering a passcode using the secure user interface system of the present invention.

FIG. 5 shows a flowchart of the general steps in entering a passcode using the secure user interface system described above. A user of the secure user interface system launches an application running on the mobile device. The application may be a game, word processing software, a web browser etc. The user may wish to access a secure website via the web browser (e.g. online bank account), or may wish to access additional functionality on a game, for example. To permit access, the application requests the user to enter a passcode or PIN (step S500). The user proceeds to enter the passcode via the secure user interface system as described above (step S502). Entry of the passcode may require the user to scroll/swipe the touchscreen of the mobile device, or may require the user to use sensors/buttons on the case, as explained earlier. If the passcode is entered by touching the touchscreen, the initial position of the user's finger on the screen and the distance it moves along the screen are known by the mobile device. This data is sent to the secure microcontroller in the case via Bluetooth® and the secure microcontroller processes the data to determine which numeral on the screen the user selected, and thus, which LED to illuminate on the case. Thus, while both the mobile device and the case are used to enter digits, the processing occurs on the case and the mobile device is unaware which numeral the user selected from the static set on the display. In the case where the passcode is entered using the sensors/buttons on the side of the case, the mobile device neither knows that the user has selected any numerals nor is aware of the processing performed by the secure microcontroller.

Once all digits of a PIN have been received by the case (and without the mobile device receiving them) (step S504), the secure microcontroller in the case performs a mathematical function on the received digits (step S506). The secure microcontroller may, for example, performing the following:

- Compare the received digits with a true PIN stored in the case. If the comparison verifies the user entered the correct PIN, the secure microcontroller proceeds to step S508. If the PIN is incorrect, the user may be permitted a number of further attempts to enter the PIN, as mentioned earlier.
- Hash the received digits using a cryptographic hash function, and compare the resultant hash value with a hash value stored in the microcontroller. This may be a securer option than the one above, as this does not require the microcontroller storing the true PIN, but merely a hash of the PIN. If the hash values match, the secure microcontroller proceeds to step S508.
- Encrypt the entered digits using a cryptographic key. In this example, the secure microcontroller does not perform the verification itself, but generates encrypted data (step S508), which is forwarded to a third party for verification. This may be more secure than the previous two examples as no data (true PIN or hashed true PIN) is stored in the case.

The output of the mathematical function performed on the data varies in each case (step S508). For example, in the case where the secure microcontroller itself verifies that the PIN is correct, the output may be a security token, a one-time password (OTP), a transaction authentication number (TAN) etc. In the case where the entered digits are encrypted, the output is encrypted data. In each case, the output is transmitted to the mobile device (step S510), using a particular wireless communication protocol, such as Bluetooth®. The data received by the mobile device can be intercepted or read by malware running on the device, but it will be difficult for the malware to determine the user's PIN which was used to generate the data. The mobile device then inputs the received data into the application that requested the passcode (step S512). Where this data is an encrypted PIN, the application decrypts the data to verify that the PIN is correct. (If not, the user may be prompted to begin the process again).

Figure 6:
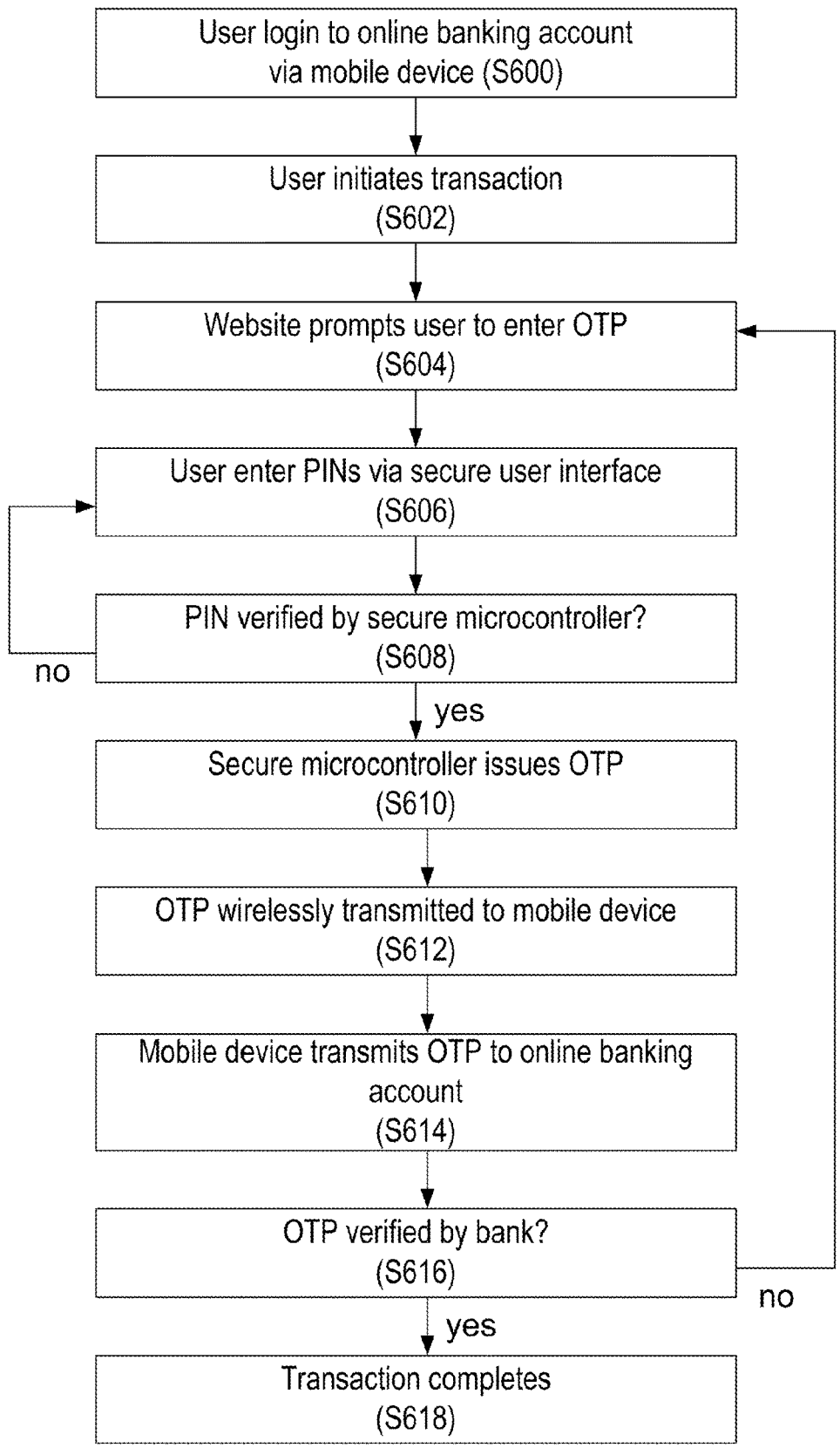
FIG. 6 shows a flowchart of the steps in performing a particular online banking transaction that requires securely entering a PIN using the secure user interface system.

The process described above and shown in FIG. 5 is general. To further explain the invention, FIG. 6 shows a flowchart of example steps in performing a particular online banking transaction. Here, the secure microcontroller knows the true PIN such that the mathematical function performed comprises comparing the PIN digits entered by the user to those of the true PIN.

In step S600, a user of the secure user interface system logs-in to their online banking account via their mobile device. Typically, the user accesses their account via a web browser. The user initiates an online banking transaction (S602), such as transferring money between accounts or making a bill payment. To ensure that the person accessing the online account is the customer associated with the bank account, and to authorise the transaction, the bank's website prompts the user to enter a one-time passcode (OTP) to continue with the transaction (S604). The OTP may be entered using any of the methods described previously. For example, the website may cause the mobile device to display a set of static numerals on the mobile device screen, which are aligned next to the LEDs of the mobile device case. When the user makes a digit selection, the microcontroller in the case stores the numeral associated with the particular illuminated LED. Thus, knowledge linking the position of each LED to a character displayed on the screen is also communicated to the case from the website.

Once the user has entered all the PIN digits, the secure microcontroller compares the stored user-entered digits with true PIN value known to the microcontroller in order to verify whether the user-entered PIN is correct (step S608). (The true PIN may be stored within the microcontroller, or may be accessible to the microcontroller from other hardware components within the case.) If the user-entered PIN is determined to be incorrect, the user may be prompted to re-enter their PIN using the same digit selection process. The user may be given a fixed number of attempts (e.g. 3) to enter the PIN, after which the user may be blocked from continuing with the online transaction.

If the PIN is verified to be correct, the secure microcontroller may issue a one-time passcode (OTP) (step S610), which is then transmitted to the mobile device (via wireless communication means such as Bluetooth®) (step S612), and further transmitted by the mobile device to the website (step S614). Even though the OTP is known to the mobile device, malware on the mobile device does not have access to the PIN and any other data used to generate the OTP because this is provided on the mobile device case only. Furthermore, an OTP has a limited life-time and is valid for a single transaction only, such that even if malware intercepted the OTP, it could not be used for fraudulent purposes as the OTP expires after it is has been used once. Additionally or alternatively, rather than issuing an OTP at step S610, the secure microcontroller may unlock access to internal resources, or issue an authorisation token to unlock access to remote resources, or encrypt the user-entered PIN using a cryptographic key for secure transmission and verification by a third party (e.g. the bank).

The bank verifies the OTP it receives (step S616). For example, it may check whether the OTP has been received a reasonable time after the OTP was generated. If too much time has lapsed (e.g. more than a few minutes) between the user initiating the transaction and requesting an OTP to be generated, and the time the OTP is received, the OTP may have expired and the bank may prompt the user to enter a new OTP. If the OTP is verified, the bank completes the online transaction (step S618).

The secure user interface system has thus far been described with reference to generating DTPs for completing online banking transactions, but this particular use has merely been used for illustrative purposes and is not limiting. The secure user interface system may be used for a variety of purposes including, but not limited to:
  a MasterCard CAP/Visa DPA (dynamic passcode authentication) calculator producing authentication codes. The secure microcontroller integrated within the case may store the same data as that in a user's "chip and pin" or EMV bankcard. Alternatively, the case may be provided with an integrated EMV bankcard reader, to enable the case to read data from the chip on the bankcard to generate authentication codes. The integrated bankcard reader may require physical contact (as in the conventional CAP readers described earlier) or may be contactless;
  an OATH-compliant OTP or TAN (transaction authentication number) generator, as mentioned above;
  a secure entry device for unlocking a local application on the mobile device, as mentioned earlier;
  a secure entry device for uploading an encrypted/hashed credential to a website/banking system, as mentioned above;
  a device for approving payments/transfers;
  a device for securely holding currency and transacting with virtual currencies such as Bitcoin®.

Integrity-Protected Entry

The secure user interface system may be used to authenticate entered data. The user may select each digit of their PIN in a similar manner to that described earlier, except that in this embodiment, the starting digit may not be randomised each time and the selected digits are not hidden on the display screen. In this embodiment, the secure microcontroller either constructs a message authentication code (MAC) using the user-entered PIN or digitally signs the PIN. Users of the secure user interface system may find this PIN entry method simpler than that previously described. However, the non-secret entry mechanism creates a corresponding risk that it will be abused. In order to minimise malware attacks in this embodiment, the user is encouraged to only enter their PIN when the secure user interface system is in "secret entry mode" (and not when the system is in "non-secret entry mode"). The two different modes of the system may be visually indicated to the user by using dual-colour LEDs. For example, if the system is in the "secret entry mode", the LEDs may be switched to green, whereas when the system is in the unsecure mode, the LEDs may be switched to red. Users may be taught not to enter their PIN unless the lights are green.

Human-Confirmed Back Channel

Figure 7:
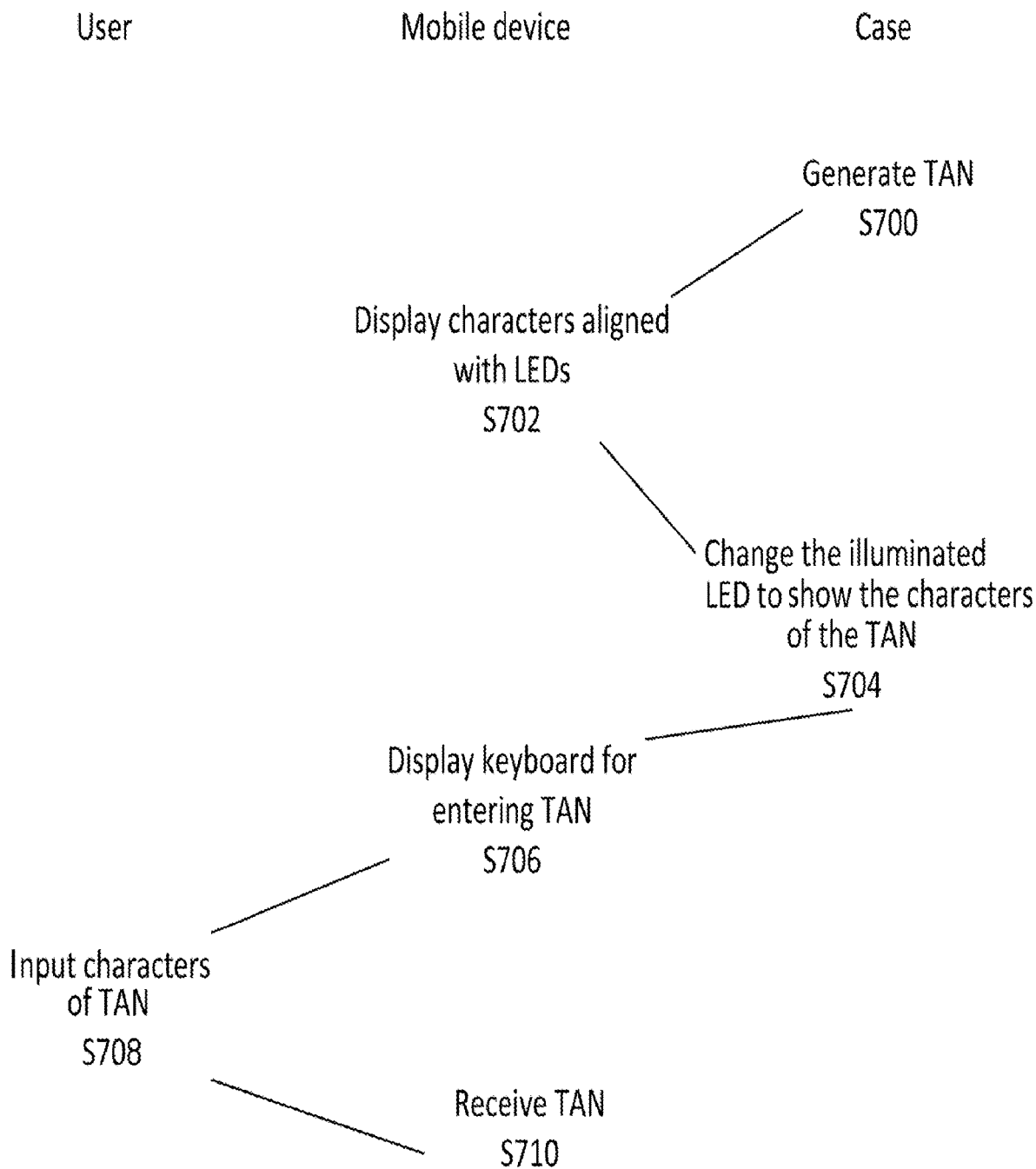
FIG. 7 shows a flowchart of the steps in creating a PIN for a user.

In an alternative arrangement of the invention, the mobile device case may not be able to communicate with the mobile device. However, the case may still perform useful functions such as generating TANs/OTPs that are either time/counter based (using a clock or counter within the case or secure microcontroller), or based on securely-entered transaction data as illustrated in FIG. 7. In the first step, the microcontroller in the case generates the TAN or OTP (S700). The generation of the TAN or OTP may be in response to a user request or other action by the user such as insertion of a card into the case where the case is so adapted. As in the previous embodiments, the mobile device displays a set of characters, each aligned with one of the LEDs (S702), It will be appreciated that the first steps can be simultaneous or in the other order. The LEDs integrated in the case may flash in sequence to show the generated TAN (S704). Simultaneously, the mobile device displays a keyboard or similar interface to enable the user to input the TAN (S706). The keypad buttons may optionally line-up with the LEDs so that the input of the code is simplified for the user. The user may then tap buttons on the virtual keypad displayed on the touch screen of the mobile device (S708). Where the LEDs are aligned with the buttons, as the user touches the appropriate keypad button in line with each flashing LED, the user enters a multi-digit numeric code by copying the LED flashes and without needing to memorise any digits of the code at all. This back channel allows the secure user interface system to be used without any need for electronic communications with the mobile device. Also as shown at the final step, the mobile device directly receives the TAN (S710) rather than the confidential data being concealed from the mobile device.

As an alternative, the user may note down or memorise the TAN as it is generated. Once the full TAN has been generated, the user may then enter the TAN in one of the more secure ways described above.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A mobile device case for generating user data to be input by a user, the mobile device case for holding a mobile device and the mobile device case comprising:
   a microcontroller; and
   a plurality of lights to display the generated user data to the user;
   wherein the microcontroller of the mobile device case is configured to:
      receive a request to generate the user data;
      generate said user data; and
      control the plurality of lights of the mobile device case, the plurality of lights aligned with a set of characters displayed by a mobile device held within the mobile device case, to flash in sequence to display the user data.

2. The mobile device case as claimed in claim 1, wherein the mobile device case further comprises a counter and the microcontroller is configured to generate the user data using a count from the counter.

3. The mobile device case as claimed in claim 1, further comprising a clock and the microcontroller is configured to generate the user data using a current time obtained from the clock.

4. The mobile device case as claimed in claim 1, wherein the microcontroller is configured to generate the user data using authentication data, wherein the authentication data comprises one or more of: data related to the type of application running on the mobile device, data related to the type of mobile device, and user-specific data.

5. The mobile device case as claimed in claim 4, further comprising a smartcard reader integrated in the mobile device case, wherein the user-specific data is obtained from a smartcard inserted in the reader.

6. The mobile device case as claimed in claim 5, wherein the user-specific data is stored in the mobile device case.

7. The mobile device case as claimed in claim 6, further comprising an embedded EMV chip which incorporates the microcontroller and wherein the user-specific data is obtained from the EMV chip.

8. The mobile device case as claimed in claim 1, wherein the controller is configured to control the plurality of lights to be illuminated one at a time in a sequence with each lit light indicating each sequential character of the user data.

9. The mobile device case as claimed in claim 1, wherein the controller is configured to control the plurality of lights to be unlit one at a time in a sequence with the unlit light indicating each sequential character of the user data.

10. A system for entering data into a mobile device, the system comprising:
    a mobile device case for generating user data to be input by a user; and
    a mobile device comprising a display;
    wherein the mobile device case is for holding the mobile device and the mobile device case comprises:
    a microcontroller; and
    a plurality of lights to display the generated user data to the user;
    wherein the microcontroller of the mobile device case is configured to:
    receive a request to generate the user data;
    generate said user data; and
    control the plurality of lights of the mobile device case, the plurality of lights aligned with a set of characters displayed by the mobile device held within the mobile device case, to flash in sequence to display the user data.

11. The system as claimed in claim 10, wherein the mobile device is configured to display a set of characters on the display.

12. The system as claimed in claim 11, wherein in use, a single light of the plurality of lights is lit at once to indicate which character of the user data is being generated.

13. The system as claimed in claim 11, wherein in use, a single light of the plurality of lights is unlit at once to indicate which character of the user data is being generated.

14. The system as claimed in claim 10, wherein the mobile device displays a virtual keypad whereby the user enters the user data as it is generated into the mobile device.

15. A method for generating user data to be input by a user, the method using a mobile device case for holding a mobile device, the mobile device case comprising a microcontroller and a plurality of lights to display the generated user data to the user, the method comprising:
    receiving, at the microcontroller of the mobile device case, a request to generate the user data;
    generating, at the microcontroller of the mobile device case, said user data; and
    controlling, via the microcontroller of the mobile device case, the plurality of lights of the mobile device case, the plurality of lights aligned with a set of characters displayed by a mobile device held within the mobile device case, to flash in sequence to display the user data.

* * * * *